Patented July 23, 1929.

1,722,076

UNITED STATES PATENT OFFICE.

MARTIN MÜLLER-CUNRADI, OF LUDWIGSHAFEN-ON-THE-RHINE, AND ANNELIESE KOSSUTH, OF MANNHEIM, GERMANY, ASSIGNORS TO I. G. FARBENINDUSTRIE AKTIENGESELLSCHAFT, OF FRANKFORT-ON-THE-MAIN, GERMANY.

STABLE IRON CARBONYL COMPOSITIONS AND THEIR MANUFACTURE.

No Drawing. Application filed April 22, 1925, Serial No. 25,140, and in Germany December 5, 1924.

Iron carbonyl, as is known, whether by itself or dissolved in a diluent has the property of being sensitive to light by the action of which it is more or less rapidly altered with the formation of a voluminous precipitate.

We have found that the decomposition of iron carbonyl by light can be retarded or even avoided by the presence of certain compounds and that solutions of iron carbonyl in hydrocarbons or in mixtures of hydrocarbons containing such compounds have a high stability. As compounds capable of exerting such desirable influence we have found, for example, organic coloring matters of any kind which are soluble or colloidally soluble in the mixture made of iron carbonyl and a hydrocarbon or mixtures thereof, for example the iron compound of acetyl aceton, or 1.4-di-para-toluido-anthraquinone, or soluble azo dyes, such for example as the dyestuff obtained by coupling diazotized amino-azo-benzene and ethyl-B-naphthyl-amine, or the dyestuff known under the registered trade mark of typophor black, oil brown (see Color Index No. 81) which is α-naphthalene-azo-α-naphthol of the formula:

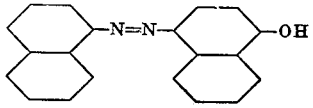

and the like of which an addition of 0.01 or 0.001 per cent is in most cases sufficient. Other organic compounds of a higher molecular weight, while not coloring matters, are also suitable, for example, 0.1 per cent of caoutchouc, adeps lanae, naphthenic acids, also hydrocarbons of a moderately high molecular weight, for example heavy gasoline, or kerosene. When the latter is added to a solution of iron carbonyl in petrol or benzine until the specific gravity of the mixture is 0.75, the composition shows a strongly increased stability. Several additions of suitable compounds may be made at the same time and the additions may be made either to the solutions intended for direct use, for example gasoline with about 0.3 per cent of iron carbonyl, or to more concentrated solutions of iron carbonyl as may be prepared for shipping or warehousing.

What we claim is:

1. As a composition of matter a solution of iron carbonyl in hydrocarbons in which the iron carbonyl is decomposable by exposure to light, colored with a soluble organic coloring matter.

2. As a stable composition of matter a solution of iron carbonyl in a gasoline, in which the iron carbonyl is decomposable by exposure to light, and an organic substance with coloring properties.

3. As a composition of matter a solution of iron carbonyl in hydrocarbons, in which the iron carbonyl is decomposable by exposure to light, colored with α-naphthalene-azo-α-naphthol.

4. As a stable composition of matter a solution of iron carbonyl in gasoline colored with α-naphthalene-azo-α-naphthol.

In testimony whereof we have hereunto set our hands.

MARTIN MÜLLER-CUNRADI.
ANNELIESE KOSSUTH.